UNITED STATES PATENT OFFICE.

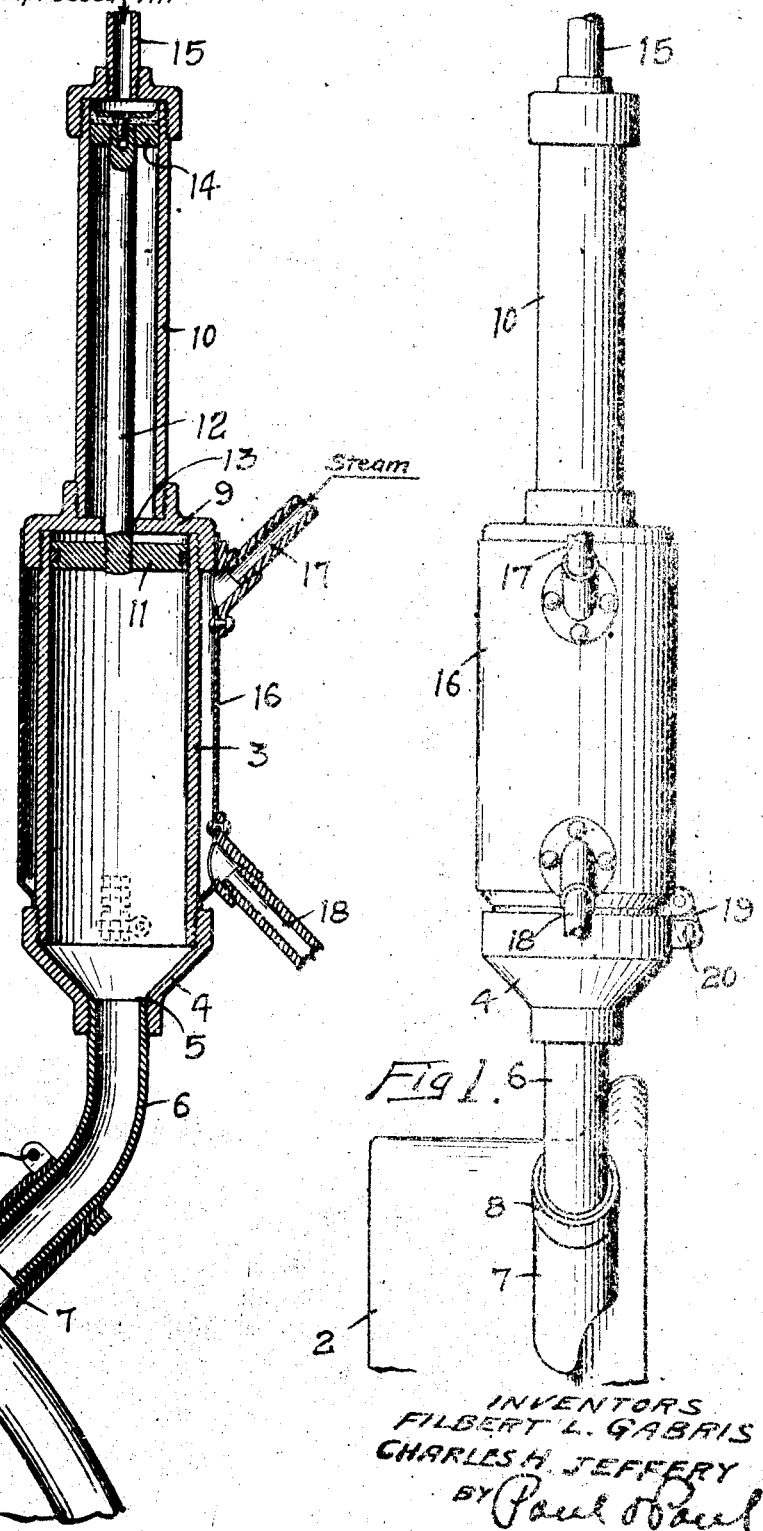

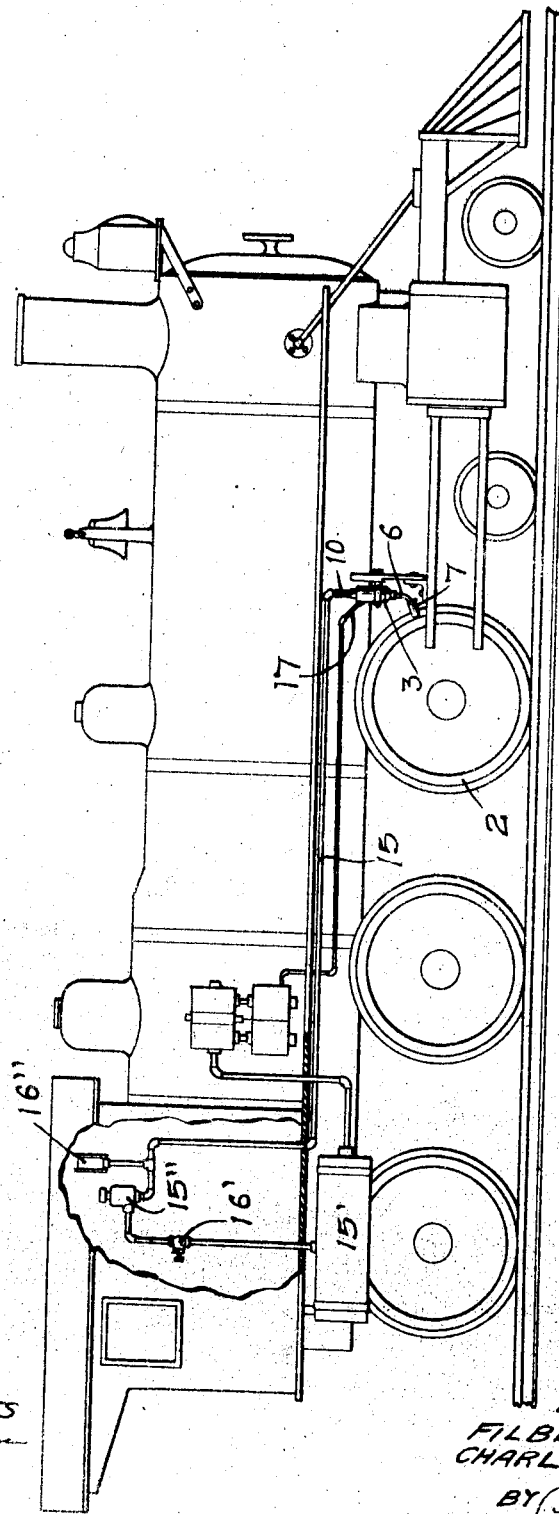

FILBERT L. GABRIS AND CHARLES H. JEFFERY, OF ST. PAUL, MINNESOTA.

FLANGE-LUBRICATOR.

1,100,551.  Specification of Letters Patent.  Patented June 16, 1914.

Application filed October 27, 1911. Serial No. 657,121.

*To all whom it may concern:*

Be it known that we, FILBERT L. GABRIS and CHARLES H. JEFFERY, of St. Paul, Ramsey county, Minnesota, have invented certain new and useful Improvements in Flange-Lubricators, of which the following is a specification.

The object of our invention is to provide a lubricating device for use particularly in connection with the driving wheel flanges of a locomotive, the device being under the control of the engineer in the cab for the purpose of applying grease to the flanges on curves in the track or any other place where the lubricating of the flanges is desirable.

The object of our invention is to provide a simple, inexpensive device by means of which the lubricating agent can be easily and quickly applied.

The invention consists generally in a receptacle adapted to contain hard grease, preferably in stick form, having suitable connections with the wheel flange and means within control of the engineer for positively feeding the lubricating agent to the flange.

Further the invention consists in jacketing the receptacle to the end that it may be inclosed in an envelop of steam in cold weather.

In the accompanying drawings forming part of this specification, Figure 1 is an outside view of a flange lubricating device embodying our invention, Fig. 2 is a vertical sectional view showing the construction of the device, and the manner of applying the grease to the flange. Fig. 3 is a side elevation of a locomotive, with a portion of the cab broken away, showing the preferred manner of mounting our invention therein.

In the drawing, 2 represents a portion of a locomotive driving wheel and 3 a cylinder in which the hard grease, preferably in stick form, is placed. This cylinder has a cone shaped lower end 4 provided with a discharge opening 5 from which a pipe 6 extends, terminating in a nozzle 7 of rubber or other flexible material, the other end of which is preferably recessed to conform to the wheel flange and deliver the lubricating agent thereon. The pipe 6 is attached to the lower end or cap 4 and this lower end or cap 4 is threaded on to the cylinder 3, as clearly shown in the drawings. The stick of grease is placed in the cylinder by removing this lower end or cap 4. This nozzle is adjustably secured to the pipe 6 by a clamp 8 and may be removed at any time for substitution when worn. The cylinder 3 also has a head 9 on which is mounted a second cylinder 10, preferably of smaller diameter than the cylinder 3 and concentric therewith. A piston 11 is provided in the cylinder 3 and its stem or rod 12 extends through a hole 13 in the head 9 and into the cylinder 10 and carries a piston or plunger 14 at its upper end. This plunger 14 slides back and forth in the cylinder 10 and at the same time reciprocates the piston 11.

A pipe 15 extends from the cylinder 10 to the cab of the locomotive and from thence to an air reservoir 15' which is connected with a pump in the usual way. A reducing valve 15'' is provided in the pipe 15 and a regulating valve 16' is provided in said pipe within the cab, by means of which the engineer can control the application of the grease to the flange of the wheel. It is not necessary that the flange should be greased at all times, and hence the valve 16' may be closed and opened only when the locomotive is rounding a curve or when, in the judgment of the engineer, the flanges should be lubricated. A gage 16'' is provided in the pipe 15 to enable the engineer to determine the pressure applied to the piston cylinders.

As heretofore stated, we prefer to use hard grease in stick form in the cylinder 3 and for use in cold weather we inclose the cylinder 3 with a jacket 16 having a steam intake pipe 17 and a discharge pipe 18 for the water of condensation. This jacket is preferably connected at its lower end to the head 4 by means of a link 19 and a pin 20.

The steam pipe 17, (see Fig. 3) is connected with the exhaust from the steam end of the air chamber of the engine and the exhaust steam, flowing around the cylinder 3, will prevent the grease from becoming congealed in cold weather. The grease may be inserted into the cylinder 3 in any suitable manner, preferably by unscrewing the head at the bottom, and the connection with the air reservoir will admit a few pounds of air pressure to the upper cylinder when the engineer opens the valve 16'. The engineer thus has perfect control over the lubricating device and may apply grease to the flanges of the wheels only when the application seems necessary.

We claim as our invention:—

A locomotive flange-lubricating device including in combination, a cylinder adapted to contain a viscous lubricating agent, said cylinder having a cone-shaped lower end with a relatively large central opening therein, a tube connected to said cylinder and having an unobstructed passage of uniform diameter therethrough, a flexible nozzle extending over the outer end of said tube and secured thereto, said nozzle having an opening therethrough of uniform diameter and of substantially the same diameter as the diameter of said tube, said nozzle being cut away on one side thereof to correspond to the flange, whereby the lubricant is directed to the flange of the wheel, a piston in said cylinder, a second cylinder connected to the first named cylinder, a piston in said second cylinder, a rod connecting said pistons and a pipe connecting the second cylinder above the piston therein with a source of fluid pressure supply.

In witness whereof, we have hereunto set our hands this 21st day of October, 1911.

FILBERT L. GABRIS.
CHAS. H. JEFFERY.

Witnesses:
 FRED R. DAVIS,
 JOHN A. FRETSCHE.